(12) United States Patent
Thai et al.

(10) Patent No.: US 8,752,161 B1
(45) Date of Patent: Jun. 10, 2014

(54) SECURING AND AUTHENTICATING MULTIPLE DEVICES BEHIND A NAT DEVICE

(75) Inventors: Hien Thi Thai, Elk Grove, CA (US);
Anupama Anand, San Jose, CA (US);
Jianxin Wang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 676 days.

(21) Appl. No.: 12/507,315

(22) Filed: Jul. 22, 2009

(51) Int. Cl.
*H04L 29/06* (2006.01)
*G06F 21/00* (2013.01)

(52) U.S. Cl.
USPC ............... 726/12; 726/15; 713/151; 713/173; 370/389; 370/395.2; 379/88.17; 379/201.01

(58) Field of Classification Search
USPC ............... 726/12, 15; 370/395.2; 379/201.01, 379/88.17; 713/151, 173
See application file for complete search history.

(56) References Cited

U.S. PATENT DOCUMENTS

| | | | | |
|---|---|---|---|---|
| 2006/0262916 | A1* | 11/2006 | Marascio et al. | 379/201.01 |
| 2006/0274741 | A1* | 12/2006 | Wing et al. | 370/389 |
| 2008/0046735 | A1* | 2/2008 | Nedeltchev et al. | 713/173 |
| 2008/0062997 | A1* | 3/2008 | Nix | 370/395.2 |
| 2008/0126794 | A1* | 5/2008 | Wang et al. | 713/151 |
| 2009/0103691 | A1* | 4/2009 | Hume et al. | 379/88.17 |

FOREIGN PATENT DOCUMENTS

WO     WO 2005011233  A1 *   2/2005

OTHER PUBLICATIONS

Pavel Segec, Tatiana Kovacikova; "A survey of open source products for building a SIP communication platform"; Jan. 2011; Advances in Multimedia, vol. 2011; Publisher: Hindawi Publishing Corp, pp. 1-21.*

* cited by examiner

*Primary Examiner* — Hadi Armouche
*Assistant Examiner* — Courtney Fields
(74) *Attorney, Agent, or Firm* — Hickman Palermo Truong Becker Bingham Wong LLP

(57) ABSTRACT

Apparatus, methods, and other embodiments associated with securing and authenticating multiple devices behind a network address translation (NAT) device are described. One example method includes controlling a phone proxy to provide security credential information to an Internet Protocol (IP) phone located behind the NAT device. The credentials may be selectively provided in response to receiving a certificate request from the IP phone. The certificate request includes IP phone identifying addresses. The method may also include controlling the phone proxy to update an entry in a secure IP phone data store to relate together the IP phone identifying addresses, a source port associated with the IP phone, and the fact that credential information was provided to the IP phone. This entry can mark the IP phone as an authorized phone. The entry may be addressable as a function of a least a portion of the IP phone identifying addresses.

19 Claims, 12 Drawing Sheets

SECURING AND AUTHENTICATING MULTIPLE DEVICES BEHIND A NAT DEVICE

TECHNICAL FIELD

This disclosure relates generally to computer network security.

BACKGROUND

Conventional phone proxies and call managers may not support more than one device (e.g., Voice over Internet Protocol (VoIP) phone) behind a remote Network Address Translation (NAT) router. Conventional phone proxies may not operate as transparent proxies and also may not see connections from phones to call managers. These limitations may negatively impact the ability to secure and authenticate devices like VoIP phones. However, as devices like VoIP phones become ubiquitous, limitations imposed on VoIP phones accessing call managers will become less and less acceptable.

BRIEF DESCRIPTION OF THE DRAWINGS

The accompanying drawings, which are incorporated in and constitute a part of the specification, illustrate various example systems, methods, and other example embodiments. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DESCRIPTION OF EXAMPLE EMBODIMENTS

Overview

Figure 1:
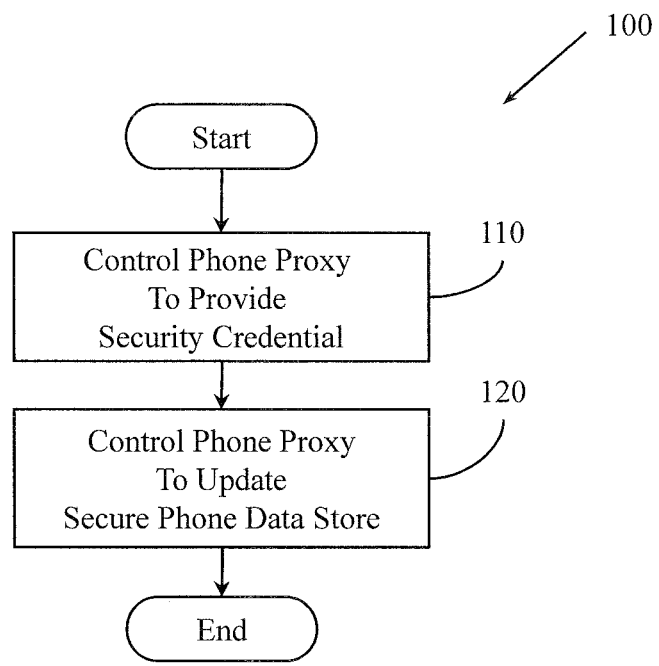
FIG. 1 illustrates an example method associated with a phone proxy facilitating securing a set of IP phones located behind a NAT device based on credentials provided by the phone proxy and security information maintained at the phone proxy.

In one embodiment, an apparatus includes a certificate logic configured to provision a member of a set of Internet Protocol (IP) phones located behind a network address translation (NAT) device in response to receiving a certificate request from the IP phone, where the certificate request includes IP phone uniquely identifying material. The apparatus also includes a provisioned IP phone data store configured to store uniquely identifying material concerning IP phones that have successfully been provisioned by the apparatus. The apparatus also includes an information control logic configured to update the provisioned IP phone data store to store information that an IP phone was provisioned by relating the IP phone uniquely identifying material and a credentialed value.

In another embodiment, a method includes controlling a phone proxy to provide security credential information to an Internet Protocol (IP) phone located behind a network address translation (NAT) device in response to receiving a certificate request from the IP phone, where the certificate request includes IP phone identifying addresses, the IP phone being one of a set of IP phones located behind the NAT device. The method also includes controlling the phone proxy to update an entry in a secure IP phone data store to relate together the IP phone identifying addresses, a source port associated with the IP phone, and the fact that the credential information was provided to the IP phone, which marks the IP phone as an authorized phone, the entry being addressable as a function of a least a portion of the IP phone identifying addresses.

DESCRIPTION

An Adaptive Security Appliance (ASA) may provide security and virtual private network (VPN) services. An ASA may be, for example, a network security device (e.g., firewall). Example methods may be performed in an ASA. An example apparatus may be an ASA. The ASA may implement an ASA phone proxy. The ASA phone proxy may be a transparent proxy with respect to the Trivial File Transfer Protocol (TFTP) and signaling transactions. The ASA phone proxy allows remote IP phones to establish secured communication channels directly with the ASA. Secure communications may therefore terminate directly in a firewall. The firewall may proxy signaling communications between the phone and a call manager. The firewall may also proxy voice streams between phones.

A proxy server is an intermediary that may act, for example, as both a client and a server for making requests and acting on behalf of other clients. A proxy may perform routing to ensure that a request is sent to another entity closer to a targeted user. A proxy may be used to enforce a policy (e.g., authorization, authentication). A proxy may be used to intercept, interpret, and rewrite a part of a message before forwarding the part of the message.

The ASA phone proxy may build a database of secure phones that have successfully downloaded their own phone proxy configuration file and the certificate trust list (CTL) from the ASA. Entries in the database can be differentiated by, for example, a source IP address associated with the IP phone, a source port associated with the IP phone, and a MAC address associated with the IP phone. The ASA phone proxy may be able to distinguish IP phones located behind a NAT based on signaling. In one example, the ASA phone proxy can rewrite packets going from an IP phone to a call manager and from the call manager to IP phone. The ASA phone proxy intercepts and buffers the phone configuration file from the UCM and rewrites certain fields in the file.

The call manager can be considered to be a signaling proxy for call events initiated over other common protocols. One example call manager is the Cisco Unified Communication Manager (CUCM). CUCM is a software based call-processing system that tracks active Voice over Internet Protocol (VoIP) network components (e.g., phones, gateways, bridges, security devices). CUCM may use the Skinny Call Control Protocol (SCCP) between endpoints (e.g., phones). CUCM may also use Session Initiation Protocol (SIP) or Media Gateway Control Protocol (MGCP) to pass signaling to gateways. CUCM evaluates called telephone numbers and then activates gateway events to send or receive calls to an Internet Protocol (IP) network or to the Public Switched Telephone Network (PSTN).

SCCP is a messaging system between a Skinny client and a Cisco call manager. For example, a Cisco 7900 IP phone uses TCP/IP to communicate with a call manager application in a cluster. SCCP is a network terminal control protocol. SCCP sends a Station Register Message to the CUCM. The device's (e.g., IP phone) station identification (e.g., MAC address) will only be present in the register message. Therefore the ASA phone proxy updates an entry in the secure phone database with the phone's IP address and source port to facilitate differentiating it from other phones behind the NAT that would have the same public IP address from the NAT. Keep alive messages coming from the IP phone over the same connection will have the same source port, which can be used to index into the secure phone database to find information to facilitate maintaining connection and timeout information.

SIP is a signaling protocol used to set up and tear down communication sessions (e.g., VoIP calls) on the Internet. SIP is a TCP/IP based application layer protocol. SIP uses an HTTP-like request/response transaction model. Transactions have a client request that invoke a server function that produces at least one response. The requests and responses have header fields that carry address information. An SIP user agent (UA) is a logical network end point that is used to create or receive SIP messages and to manage an SIP session. An SIP UA can be a client (UAC) or a server (UAS). Resources in an SIP network are identified by a unique resource identifier (URI) (e.g., sip:username:password@host.port). When security is desired, SIP messages are transported over Transport Layer Security (TLS). Two SIP endpoints can communicate without intervening SIP infrastructure, but rarely do. The ASA phone proxy can manage timeouts associated with an SIP connection. When the SIP register message is sent to the CUCM, the ASA phone proxy can extract the MAC address and the source port for the connection on which the register message arrived. The ASA phone proxy can then update the secure database with this MAC address and source port information. The MAC address will also be available in register refresh messages, which the ASA phone proxy can see and use to update timeout values to maintain a connection.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

It has proven convenient at times, principally for reasons of common usage, to refer to these signals as bits, values, elements, symbols, characters, terms, and numbers. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining refer to actions and processes of a computer system, logic, processor, or similar electronic device that manipulates and transforms data represented as physical (electronic) quantities.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to non-executable stored instructions being claimed as stored instructions per se (e.g., a program listing). The instructions may be embodied in various forms including routines, algorithms, modules, methods, threads, and/or programs including separate applications or code from dynamically linked libraries.

References to "one embodiment", "an embodiment", "one example", "an example", indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

FIG. 1 illustrates a method 100. Method 100 may be performed by a phone proxy to facilitate securing a set of IP phones located behind a NAT device. The security may be based on credentials provided by the phone proxy to members of the set of IP phones. The security may also be based on security information maintained at the phone proxy.

Method 100 may include, at 110, controlling a phone proxy to provide security credential information to an Internet Protocol (IP) phone located behind a network address translation (NAT) device. The security credential information may be provided in response to receiving a certificate request from the IP phone. The certificate request may include IP phone identifying addresses. In one example, the security credential information may include a certificate trust list (CTL), and a configuration file. The CTL may identify devices that are to be trusted in a secure network. The configuration file may identify parameters to be used for secure communications. In one example, the IP phone identifying addresses may include a media access control (MAC) address associated with the IP phone, a private IP address associated with the IP phone, and a public IP address associated with the NAT device. The MAC address will be unique to the hardware associated with the IP phone. The private IP address may be assigned by a local network with which the IP phone is associated. The public IP address may be provided to the NAT by a Dynamic Host Configuration Protocol (DHCP) server.

Method 100 may also include, at 120, controlling the phone proxy to update an entry in a secure IP phone data store. The entry may be programmed to relate together the IP phone identifying addresses, a source port associated with the IP phone, and the fact that the credential information was provided to the IP phone. The fact that the credential information was provided to the IP phone marks the IP phone as an authorized phone. In one example, the entry may be addressable as a function of a least a portion of the IP phone identifying addresses. In one example, the secure IP phone data store is a database. In this example, the entry in the secure IP phone data store entry is a record that relates the MAC address, the private IP address, the public IP address, a source port associated with the IP phone, and the fact that the security credential information was provided to the IP phone. Relating these data points together facilitates addressing the record on different values (e.g., MAC address, source port). Relating these data points together also facilitates, for example, rewriting packets to swap public and private IP addresses.

"Data store", as used herein, refers to a physical and/or logical entity that can store data. A data store may be, for example, a database, a table, a file, a list, a queue, a heap, a memory, and a register. In different examples, a data store may reside in one logical and/or physical entity and/or may be distributed between two or more logical and/or physical entities. In some examples, "database" is used to refer to a table. In other examples, "database" may be used to refer to a set of tables. In still other examples, "database" may refer to a set of data stores and methods for accessing and/or manipulating those data stores.

While FIG. 1 illustrates various actions occurring in serial, it is to be appreciated that various actions illustrated in FIG. 1 could occur substantially in parallel. By way of illustration, a first process could control a phone proxy to provide security credentials and a second process could control a phone proxy to update a secure phone data store. While two processes are described, it is to be appreciated that a greater and/or lesser number of processes could be employed and that lightweight processes, regular processes, threads, and other approaches could be employed.

In one example, executable instructions associated with performing a method may be embodied on a computer readable medium. When executed, the instructions may perform a method. Thus, in one example, a computer readable medium may store computer executable instructions that if executed by a machine (e.g., processor) cause the machine to perform method 100. While executable instructions associated with the above method are described as being embodied on a computer readable medium, it is to be appreciated that executable instructions associated with other example methods described herein may also be stored on a computer readable medium.

A "computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 2:
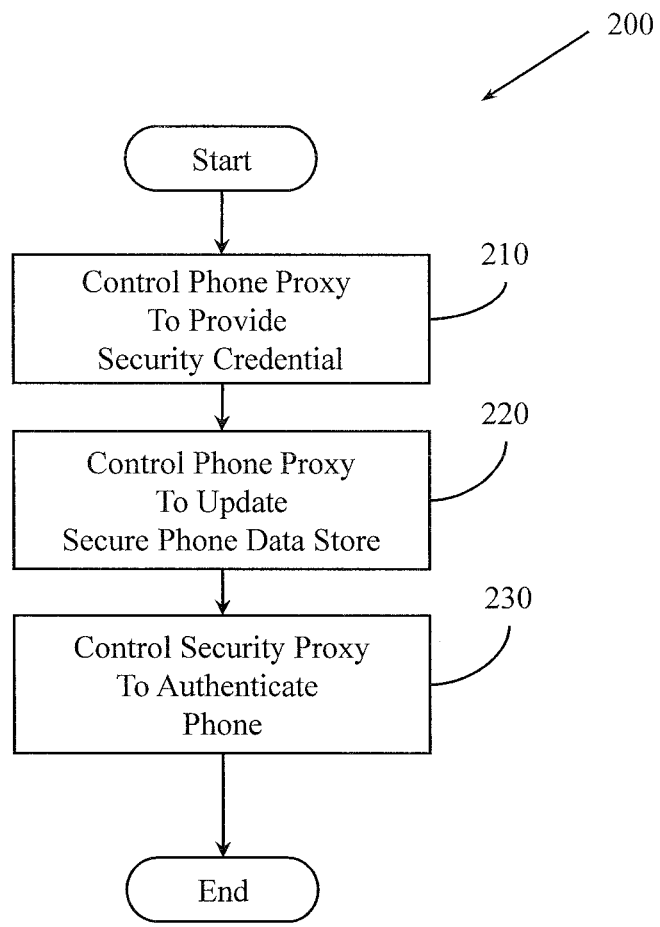
FIG. 2 illustrates another embodiment of an example method associated with a phone proxy facilitating securing a set of IP phones located behind a NAT device based on credentials provided by the phone proxy and security information maintained at the phone proxy.

FIG. 2 illustrates a method 200. Method 200 includes controlling the phone proxy to provide credentials at 210 and controlling the phone proxy to update a security database at 220. However, method 200 also includes, at 230, controlling a security proxy to selectively authenticate the IP phone in response to receiving a connection request from the IP phone. In one example, the security proxy is a transport layer security (TLS) proxy. One skilled in the art will appreciate that other security proxies may be employed.

In one example, the connection request may include the IP phone identifying addresses (e.g., MAC address). Since both the connection request and the certificate request may include identifying addresses (e.g., MAC address), a correlation may be made between the requests. Therefore, authentication of the IP phone may be based, at least in part, on data stored in the secure IP phone data store in association with satisfying a certificate request. Recall that the information in the secure IP phone data store is addressable by the IP phone identifying addresses (e.g., MAC address). By way of illustration, a connection request may be received that includes the MAC address of a specific VoIP phone. The phone proxy can search its database for a record that includes the MAC address. If there is no record, then the VoIP phone has not been credentialed and thus the authentication will fail. If there is a record, then the record can be examined to determine whether the CTL and configuration file were successfully transmitted to the VoIP phone. If they were, then the VoIP phone is credentialed and the authentication will succeed. One skilled in the art will appreciate that authentication may also include an SSL handshake between the ASA and the phone.

Method 200 may work with phones and proxies that operate using different protocols. Thus, in one example, the connection request may be a call manager registration request. Different call managers may use different protocols. Therefore, in one example, the call manager registration request may be a Session Initiation Protocol (SIP) registration request. The SIP registration request will include the MAC address of the IP phone. In another example, the call manager registration request may be a Skinny Call Control Protocol (SCCP) station register message. The SCCP station register message will include the MAC address of the IP phone. While an SIP register message and an SCCP station register message are described, one skilled in the art will appreciate that other protocols and other messages may be employed.

Figure 3:
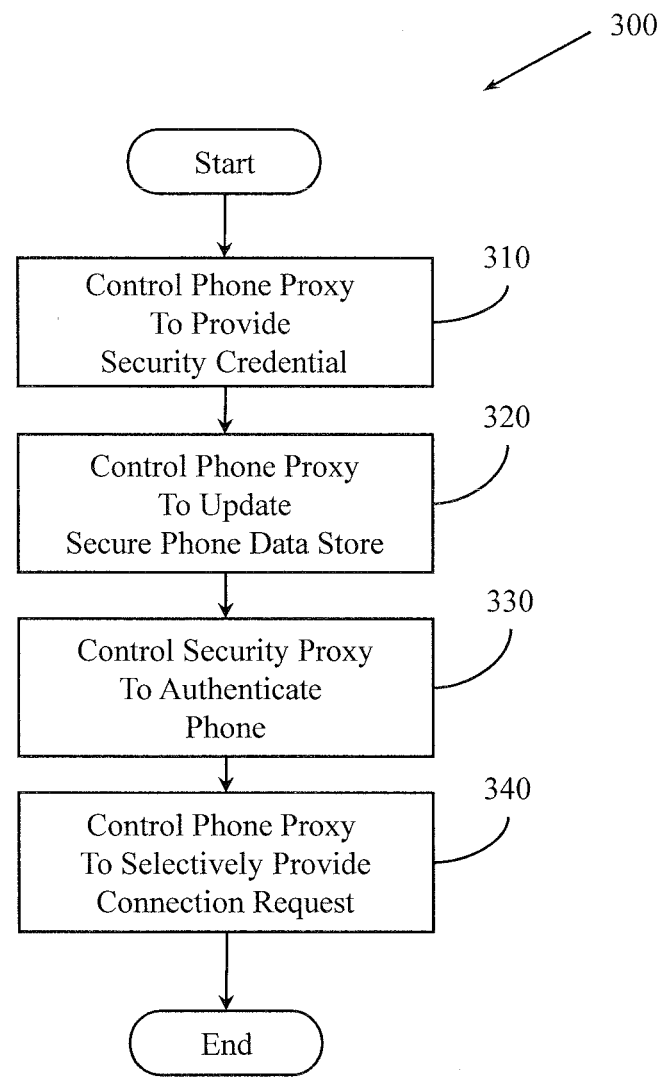
FIG. 3 illustrates another embodiment of an example method associated with a phone proxy facilitating securing a set of IP phones located behind a NAT device based on credentials provided by the phone proxy and security information maintained at the phone proxy.

FIG. 3 illustrates a method 300. Method 300 includes controlling the phone proxy to provide credentials at 310, controlling the phone proxy to update a security database at 320, and controlling a security proxy to selectively authenticate the IP phone in response to receiving a connection request from the IP phone at 330. However, method 300 also includes, at 340, controlling the phone proxy to selectively provide the connection request to a call manager upon determining that the IP phone was successfully authenticated by the security proxy. If the IP phone was not successfully authenticated at 330, then the connection request may not be provided to the call manager. If the IP phone was successfully authenticated at 330, then the connection request may be provided to the call manager.

Figure 4:
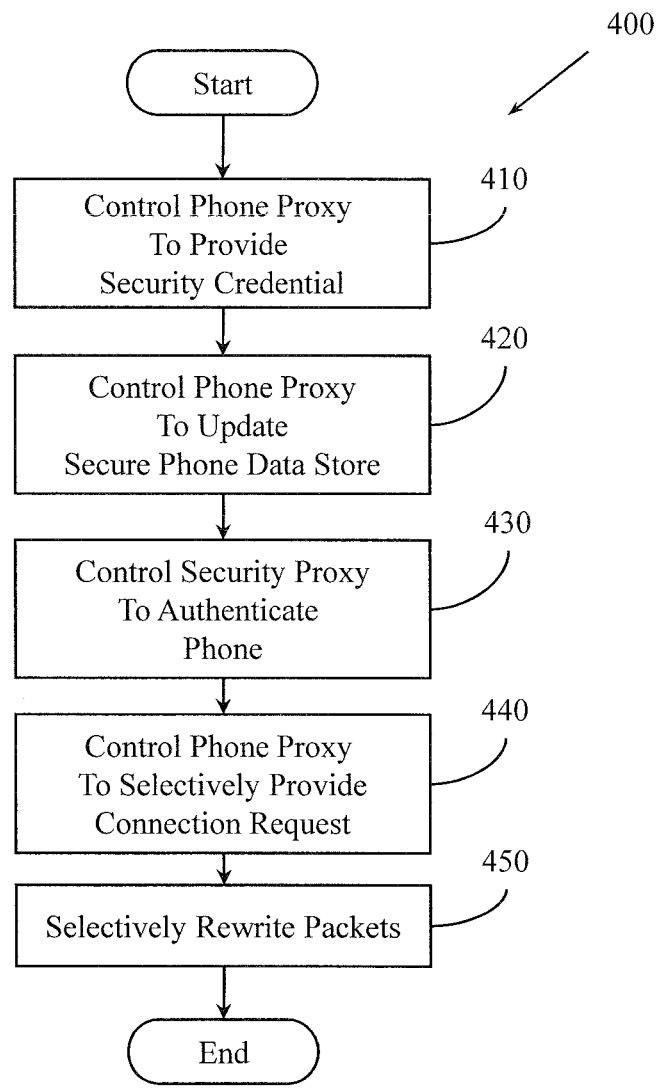
FIG. 4 illustrates another embodiment of an example method associated with a phone proxy facilitating securing a set of IP phones located behind a NAT device based on credentials provided by the phone proxy and security information maintained at the phone proxy.

FIG. 4 illustrates a method 400. Method 400 includes controlling the phone proxy to provide credentials at 410, controlling the phone proxy to update a security database at 420, controlling a security proxy to selectively authenticate the IP phone in response to receiving a connection request from the IP phone at 430, and controlling the phone proxy to selectively provide the connection request to a call manager at 440 upon determining that the IP phone was successfully authenticated by the security proxy. Method 400, also includes, at 450, selectively rewriting a portion of an inbound packet received from the IP phone to make the inbound packet comply with a protocol associated with the call manager. After being rewritten, the rewritten inbound packet can be provided to the call manager. In one example, the inbound packet includes a private IP address of the IP phone. However, the call manager may not be configured to process that private IP address. Instead, the call manager may be configured to process a public IP address like that associated with the NAT device behind which the IP phone resides. Therefore, rewriting the inbound packet to comply with a protocol associated with the call manager may include replacing the private IP address with a public IP address associated with the NAT device. In one example, the public IP address may be available in the packet received from the IP phone. In another example, the public IP address may need to be retrieved from the secure IP phone database. In this example, the database may be indexed using, for example, a source port and/or private IP address associated with the IP phone to retrieve the previously recorded public IP address.

Method 400 also includes, at 450, selectively rewriting a portion of an outbound packet received from the call manager to make the outbound packet comply with a protocol associated with the IP phone. After being rewritten, the rewritten outbound packet can be provided to the IP phone. In one example, the outbound packet includes a public IP address of the NAT device associated with the IP phone. However, the IP phone may not be configured to process that public IP address. Instead, the IP phone may be configured to process a private IP address associated with the IP phone. Therefore, rewriting the outbound packet to comply with a protocol associated with the IP phone may include replacing the public IP address with a private IP address. In one example, the private IP address may need to be retrieved from the secure IP phone database. In this example, the database may be indexed using, for example, a source port and/or public IP address associated with the NAT device to retrieve the previously recorded private IP address. While selectively rewriting a packet is illustrated at 450, some rewriting of packets may also occur at 410. This rewriting may occur at the TFTP level. For example, when a phone's configuration file is received, that configuration file may be rewritten with respect to things including the NAT of the UCM's address, and the device security mode of the phone. Additionally, rewriting may include accommodating changes from TCP to TLS and vice versa.

Figure 5:
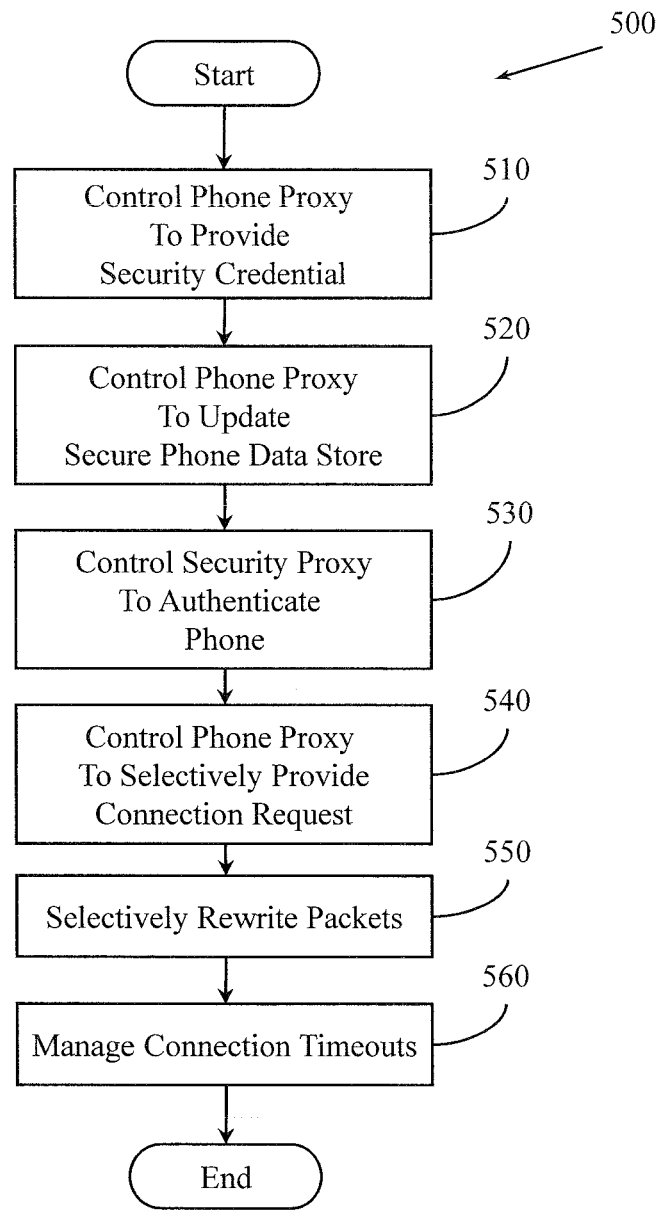
FIG. 5 illustrates another embodiment of an example method associated with a phone proxy facilitating securing a set of IP phones located behind a NAT device based on credentials provided by the phone proxy and security information maintained at the phone proxy.

FIG. 5 illustrates a method 500. Method 500 includes controlling the phone proxy to provide credentials at 510, controlling the phone proxy to update a security database at 520, controlling a security proxy to selectively authenticate the IP phone in response to receiving a connection request from the IP phone at 530, controlling the phone proxy to selectively provide the connection request to a call manager at 540 upon determining that the IP phone was successfully authenticated by the security proxy, and, at 550, selectively rewriting portions of inbound packet and outbound packets.

Method 500 also includes, at 560, managing a timeout property associated with a connection between the IP phone and the call manager. The timeout property, and thus a connection timeout, may be managed as a function of monitoring protocol messages associated with the connection and data stored in the secure IP phone data store. Different protocols may transmit different messages that may be monitored to facilitate maintaining connection state. In one example, the protocol message is an SIP register refresh message. In another example, the protocol message is an SCCP keep alive message. In the SIP register refresh message, a MAC address associated with the IP phone may be available. In this example, the secure IP phone database may be searched using the MAC address and a connection timeout value may be selectively manipulated based on information available in the secure IP phone database. In the SCCP keep alive message, a source port associated with the IP phone may be available. In this example, the secure IP phone database may be searched using the source port and a connection timeout value may be selectively manipulated based on information available in the secure IP phone database. In the SIP example, the timeout property may also be updated as a function of the port.

Managing a timeout property at 560 may include multiple actions. For example, the managing may include receiving a connection protocol message associated with a connection between a connected IP phone and a connected call manager. The connection protocol message may be received in the phone proxy. The phone proxy may then extract connected IP phone identifying information from the connection protocol message. The connected IP phone identifying information may be, for example, a MAC address, and a source port. The managing may also include identifying the connected IP phone. Once the connected IP phone has been identified, the managing may also include identifying the connection between the identified connected IP phone and the connected call manager. The identification may be based on the IP phone identifying information and information stored in the secure IP phone data store.

With the IP phone and the connection identified, the managing may then include selectively manipulating a timeout value associated with the connection. In this way the phone proxy may facilitate keeping a connection open between a secure IP phone located behind a NAT device and a call manager.

Figure 6:
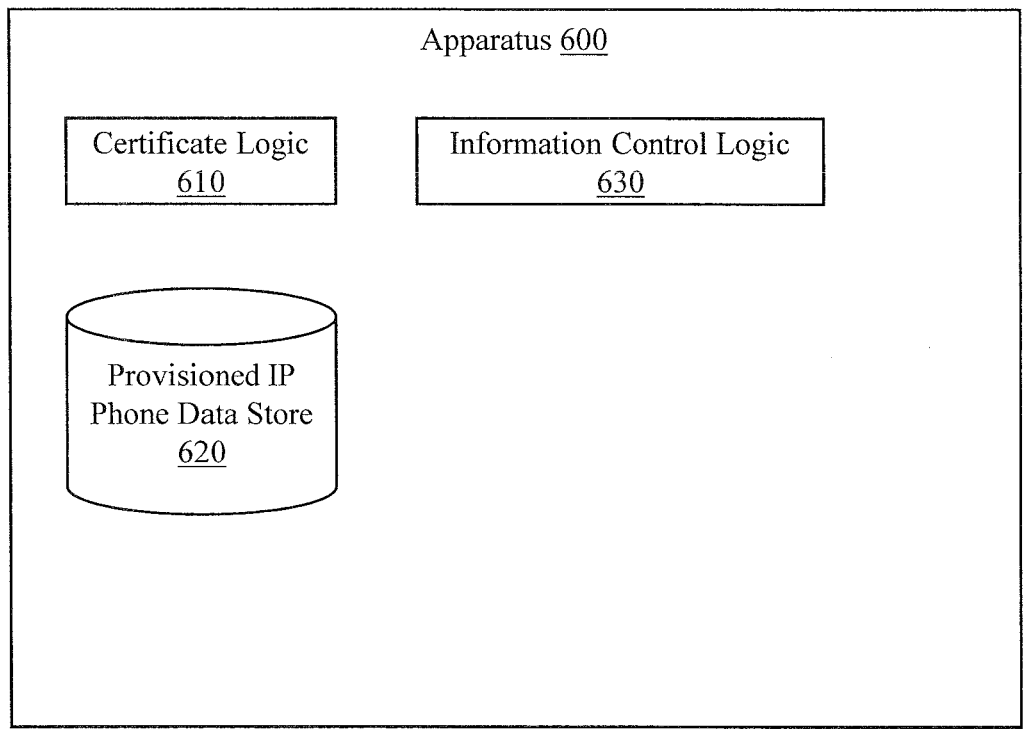
FIG. 6 illustrates an example phone proxy IP phone security apparatus.

FIG. 6 illustrates an example phone proxy IP phone security apparatus 600. Apparatus 600 includes a certificate logic 610. "Logic", as used herein with respect to apparatus, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, and a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics. Certificate logic 610 is configured to provision a member of a set of Internet Protocol (IP) phones located behind a network address translation (NAT) device. In one example, the certificate logic 610 is configured to provision the IP phone with a certificate trust list (CTL) and a configuration file. IP phones may each have their own private IP address but may also send packets that are updated to include the public IP address associated with the NAT device. A phone proxy may wish to provide security for these IP phones. Therefore, certificate logic 610 may, in response to receiving a certificate request that includes IP phone uniquely identifying material, provide the credentials to the IP phone. The phone proxy may also wish to track which IP phones it has provisioned.

Therefore apparatus 600 may also include a provisioned IP phone data store 620. Data store 620 may be configured to store uniquely identifying material concerning IP phones that have successfully been provisioned by the apparatus. In one example, the IP phone uniquely identifying information may include a media access control (MAC) address associated with the IP phone, a private IP address associated with the IP phone, a public IP address associated with the NAT device, and a source port associated with the IP phone. In one example, the provisioned IP phone data store 620 is a database table. The table may be built from records that relate the IP phone uniquely identifying material, connection timeout information, and IP phone provisioning state information. These records may be consulted by other embodiments of apparatus 600 as described below. While a database table and records are described, one skilled in the art will appreciate that other data stores (e.g., graphs) and entries (e.g., nodes) may be employed.

Apparatus 600 may also include an information control logic 630. The information control logic 630 may be configured to update the provisioned IP phone data store 620 to store information that an IP phone was provisioned. The data store 620 may be updated by manipulating an entry to relate the IP phone uniquely identifying material and a credentialed value. For example, a database record may be found based on a MAC address and a binary value that indicates whether the IP phone associated with that MAC address has been credentialed may be altered.

Figure 7:
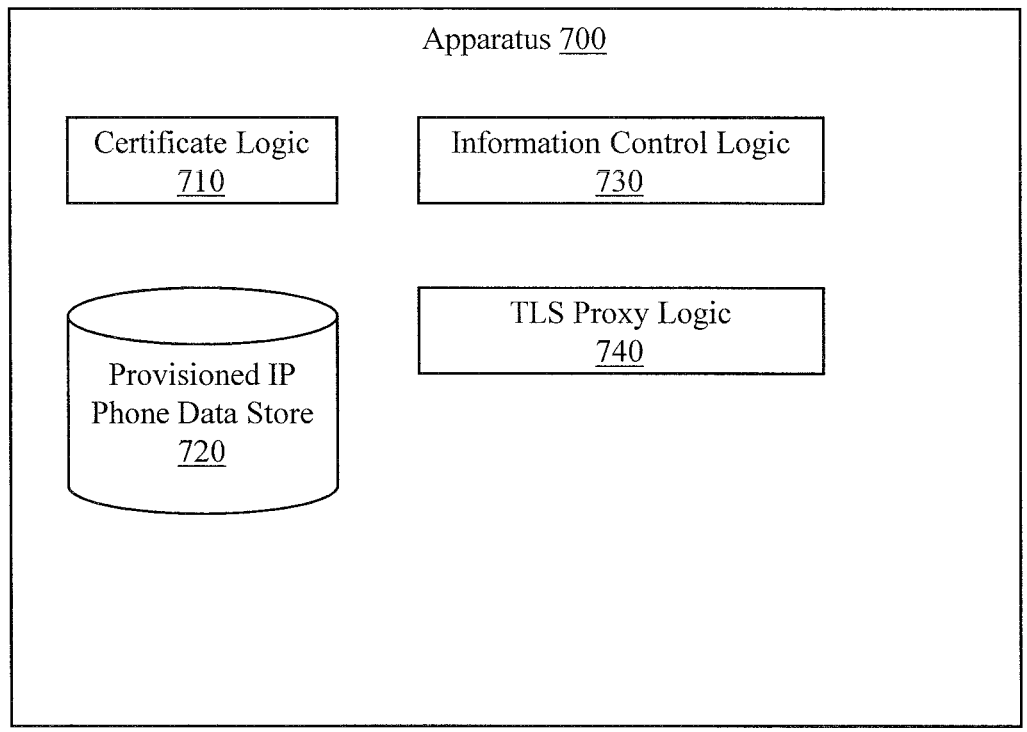
FIG. 7 illustrates another embodiment of the example phone proxy IP phone security apparatus.

FIG. 7 illustrates an apparatus 700. Apparatus 700 includes some elements similar to those described above. For example, apparatus 700 includes a certificate logic 710, a data store 720, and an information control logic 730. Apparatus 700 also includes a transport layer security (TLS) proxy logic 740. Proxy logic 740 may be configured to selectively authenticate an IP phone. In one example, proxy logic 740 will authenticate an IP phone in response to receiving a call manager connection registration request from the IP phone. The authentication may be a function of MAC addressable data stored in the provisioned IP phone data store 720. By way of illustration, the TLS proxy may receive a message during the SSL handshake that includes a MAC address associated with an IP phone. When the phone presents its certificate to the proxy logic 740, the certificate will have the phone's MAC address information. The proxy logic 740 can extract that information to make it available. The proxy logic 740 may therefore access the data store 720 to see whether an entry concerning that MAC address is present. If there is no entry, then the authentication will fail. If there is an entry, and if the entry indicates that the IP phone has successfully received the appropriate credentials, then the authentication may pass. While a TLS proxy logic 740 is described, one skilled in the art will appreciate that other types of security proxies may be employed.

Figure 8:
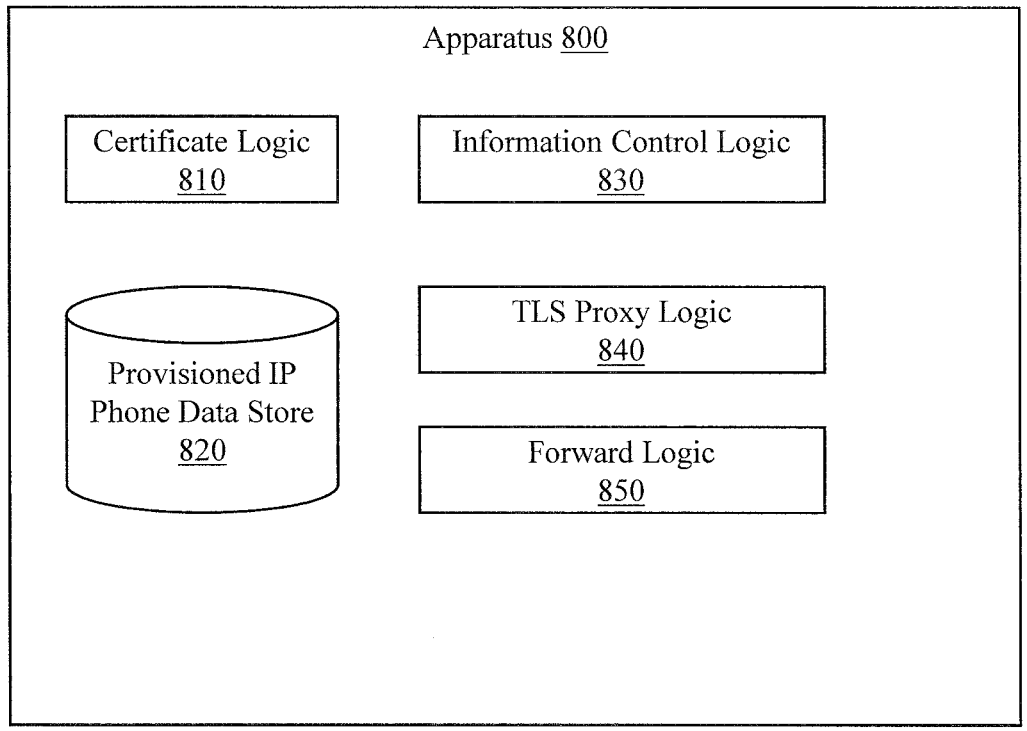
FIG. 8 illustrates another embodiment of the example phone proxy IP phone security apparatus.

FIG. 8 illustrates an apparatus 800. Apparatus 800 includes some elements similar to those described above. For example, apparatus 800 includes a certificate logic 810, a data store 820, an information control logic 830, and a proxy logic 840. Apparatus 800 also includes a forward logic 850. Forward logic 850 may be configured to selectively provide the IP phone connection registration request to a call manager. Whether the forward logic 850 provides the request to the call manager may depend on whether the IP phone was successfully authenticated by the TLS proxy logic 840.

The forward logic 850 may also be configured to selectively rewrite packets flowing from the IP phone to the call manager and from the call manager to the IP phone. This rewriting may facilitate handling traffic from an IP phone that includes, for example, a private IP address that would cause issues at the call manager. This rewriting may also facilitate handling traffic from a call manager that includes, for example, a public IP address that would cause issues at the IP phone. Thus, in one example, the forward logic 850 is configured to selectively replace a private IP address located in an inbound packet received from an IP phone to a public IP address associated with a NAT device associated with the IP phone. In another example, the forward logic 850 is configured to selectively replace a public IP address in an outbound packet received from the call manager with a private IP address associated with an IP phone.

Figure 9:
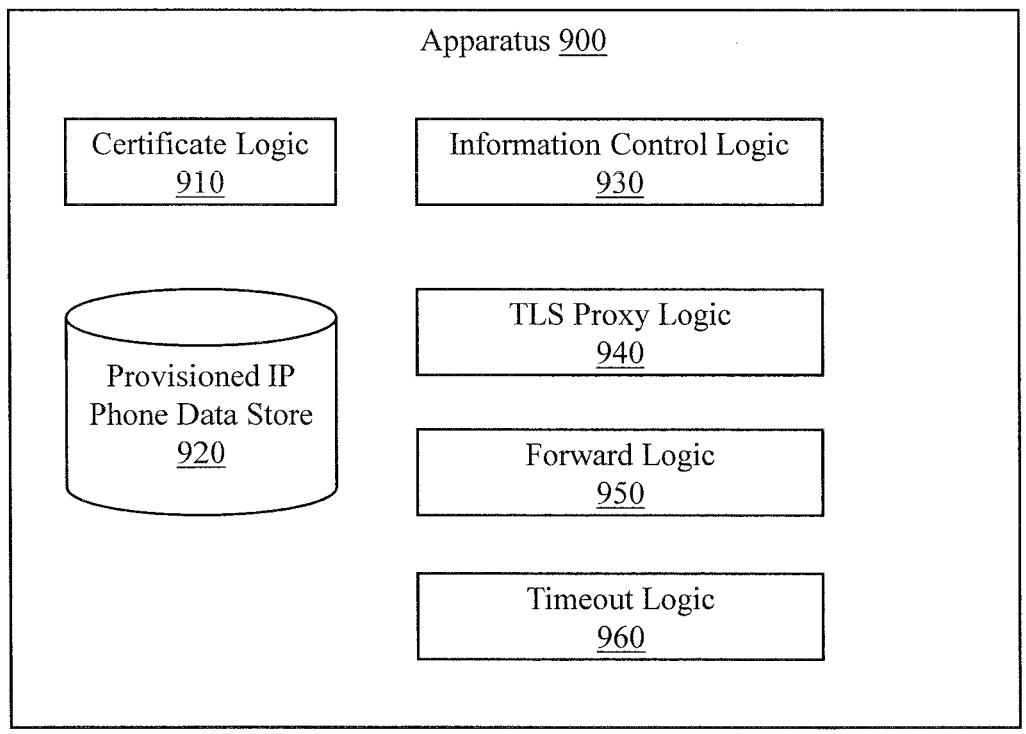
FIG. 9 illustrates another embodiment of the example phone proxy IP phone security apparatus.

FIG. 9 illustrates an apparatus 900. Apparatus 900 includes some elements similar to those described above. For example, apparatus 900 includes a certificate logic 910, a data store 920, an information control logic 930, a proxy logic 940, and a forward logic 950. Apparatus 900 also includes a timeout logic 960. Timeout logic 960 may be configured to manage connection timeouts between the IP phone and the call manager. Apparatus 900 may monitor protocol messages sent from the IP phone or from the call manager. The protocol messages may be, for example, SIP register refresh messages, and SCCP keep alive messages. The protocol messages may include information (e.g., MAC address, source port) that facilitate uniquely identifying an IP phone and retrieving a record associated with the IP phone from the data store 920. Thus, timeout logic 960 may manage connection timeouts as a function of protocol messages associated with the connection and data stored in the provisioned IP phone data store 920.

Figure 10:
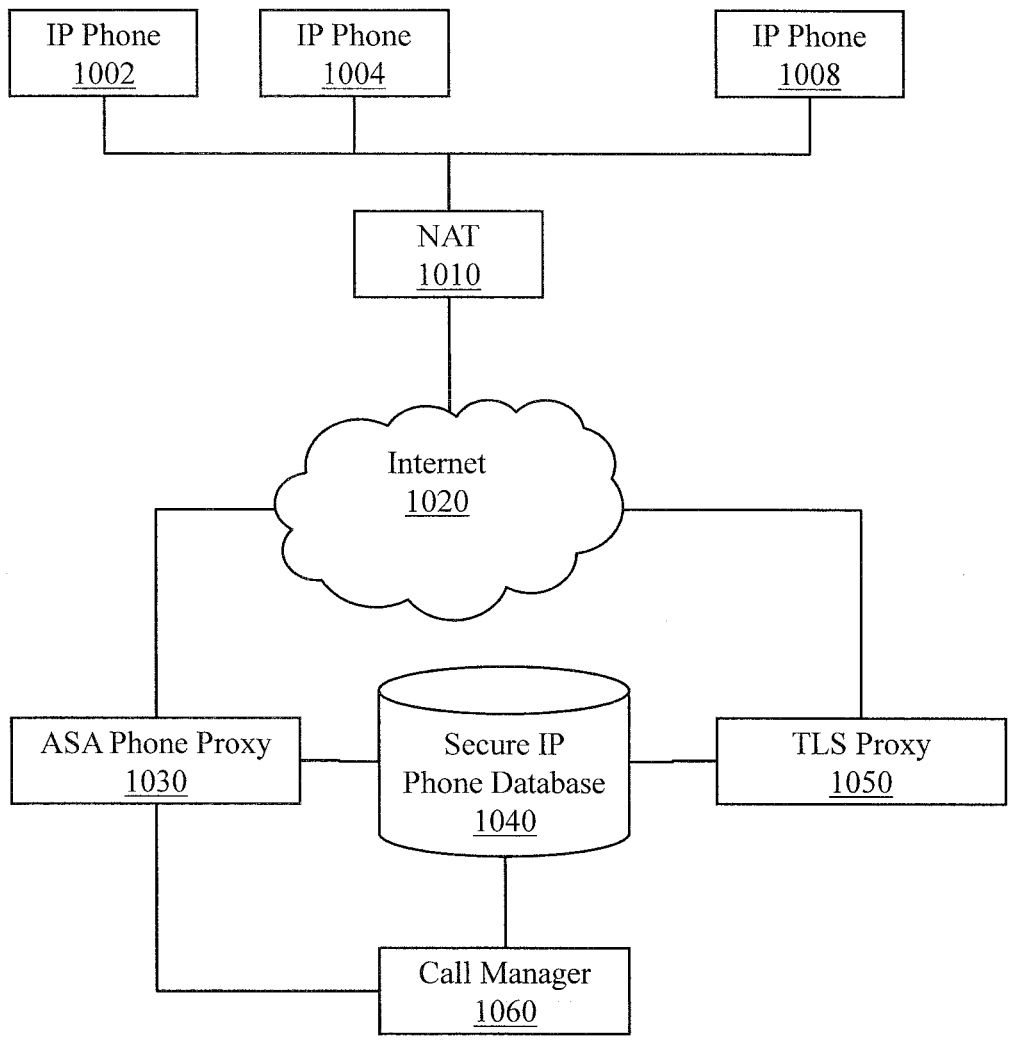
FIG. 10 illustrates an environment in which example apparatus and methods may operate.

FIG. 10 illustrates an environment in which example systems and methods may operate. A number of IP phones (e.g., phone 1002, phone 1004, . . . phone 1008) may be positioned behind a NAT device 1010. While the IP phones may have individual private IP addresses, traffic from a phone may be reconfigured with a public IP address associated with the NAT device 1010. The public IP address facilitates the traffic traversing a public network (e.g., Internet 1020).

An entity (e.g., organization, corporation) may have a call manager 1060. This application describes a phone proxy 1030 that facilitates providing security for the IP phones as they interact with the call manager 1060. In one example, the phone proxy 1030 may be implemented on an adaptive security appliance. The phone proxy 1030 may build and maintain a secure IP phone database 1040. The phone proxy 1030 may also impose security (e.g., TLS security) on the IP phones. Therefore a TLS proxy 1050 may be tasked with authenticating IP phones before their connection requests are allowed to be presented to call manager 1060.

Figure 11:
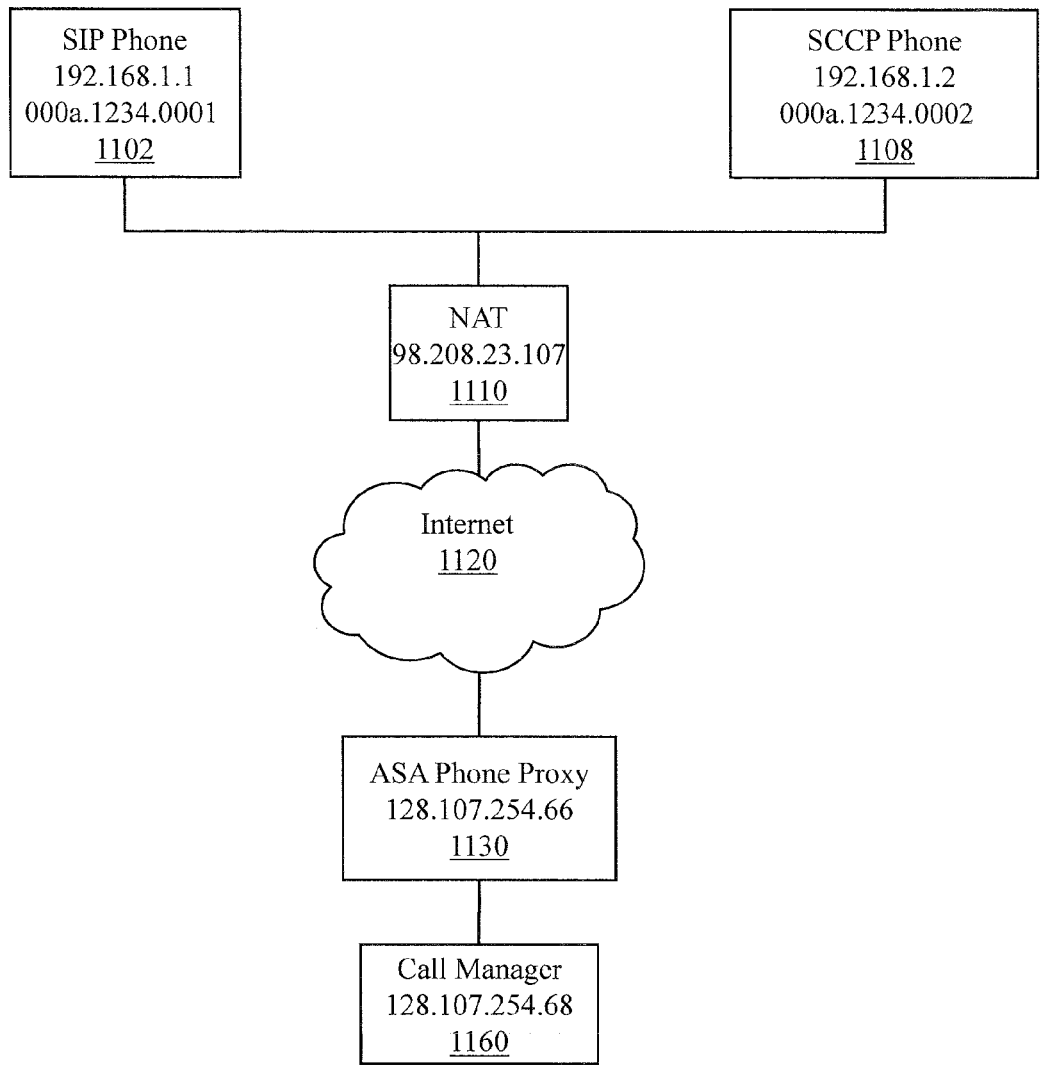
FIG. 11 illustrates an environment in which example apparatus and methods may operate.

FIG. 11 illustrates in more detail an environment in which example apparatus and methods may operate. The figure illustrates a simple topology where an SIP phone 1102 and an SCCP phone 1108 are located behind a home router 1110 and are connecting to the corporate call manager 1160 through the ASA Phone proxy 1130. The ASA Phone proxy 1130 forces the IP Phone 1102 to do secure signaling (TLS for SIP/SCCP signaling) and secure media (SRTP). The DHCP address that the NAT router 1110 gets from the Service Provider is 98.208.23.107.

When the phones boot up, they will request a CTL file and configuration file. A request will contain a phone MAC address. The ASA Phone proxy 1130 extracts and creates a secure-phone entry hashed based on the IP address, and/or the MAC address. The hash entry will contain a list of secure-phone entries. The entries are differentiated by the MAC address and interface. After a phone receives its configuration file, it initiates and starts signaling on the TLS connection.

After successful TFTP transactions to download the CTL and configuration file, the secure-phone database associated with the phone proxy 1130 would appear as illustrated below, assuming that the interface on the ASA facing the Internet is the "outside" and the interface facing the CUCM is on the "inside":

| Interface | IP Address | Port | MAC | Timeout | Idle |
|---|---|---|---|---|---|
| outside | 98.208.23.107 | 0 | 000a.1234.0001 | 0:05:00 | 0:00:13 |
| outside | 98.208.23.107 | 0 | 000a.1234.0002 | 0:05:00 | 0:00:15 |

Before a phone can contact the CUCM 1160 to register, a TLS proxy will authenticate the phone. When a phone presents its certificate to the TLS proxy, the subject name in the certificate will contain the phone's MAC address as illustrated below:
    subject-name    cn=CP-7941G-SEP000A12340001, ou=EVVBU,o=Cisco Systems Inc
    subject-name    cn=CP-7941G-SEP000A12340002, ou=EVVBU,o=Cisco Systems Inc The TLS proxy will extract the phone's MAC address from the subject name and check to see if a phone with that MAC address and source IP is in the secure-phone database. If the phone is in the secure-phone database, then the TLS proxy will proceed with the handshake and the phone can register with the CUCM 1160. If the phone is not in the secure-phone database, then the TLS proxy will reject the certificate and the phone will not be able to register with the CUCM 1160.

Once the phone finishes the TLS handshake with the TLS Proxy, an SIP Register message will be sent to the CUCM 1160 if it was configured to use SIP, or a StationRegisterMessage will be sent to the CUCM 1160 if it was configured to use SCCP. The ASA phone-proxy 1130 will extract the phone's MAC address from these messages in order to update the timestamp of the secure phone's entries. Recall that a secure phone entry may be removed after some configured idle timeout.

For the SCCP protocol, the device's station ID (MAC address) is present only in the Register message. An example is provided below:
    Data Length: 68
    Reserved/Protocol Version: 0x00000000
    Message ID: Register (0x00000001)
    DeviceName: SEP000a12340002
    StationUserId: 0
    StationInstance: 0
    IP Address: 192.168.1.2

So when the ASA phone proxy 1130 intercepts the SCCP StationRegister message, the ASA phone proxy 1130 will update the secure phone's entry with the phone's source port to differentiate it from the other phones with the same IP address. The connection on the ASA is described below:
    Source IP Address/port: 98.208.23.107/7158
    Destination IP Address/port: 128.107.254.68/2443
    and the secure phone database will now have the port entry populated as described below:

| Interface | IP Address | Port | MAC | Timeout | Idle |
|---|---|---|---|---|---|
| outside | 98.208.23.107 | 0 | 000a.1234.0001 | 0:05:00 | 0:00:13 |
| outside | 98.208.23.107 | 7158 | 000a.1234.0002 | 0:05:00 | 0:00:00 |

When KeepAlive messages are sent, they are sent on the same connection as the StationRegister. Therefore the secure phone's entry in the secure phone database can be updated using the phone's source IP address and port to identify the phone.

The MAC address of SIP phones are contained in the Contact Header of the Register message. The "sip.instance" media feature tag inside the Contact Header is used to identify the Device as illustrated below:
    Contact: <sip:line1@192.168.1.1>;+sip.instance=
    "<urn:uuid:00000000-0000-0000-0000-
        000A12340001>"

When the ASA phone-proxy 1130 inspects the SIP Register message, it will extract the MAC address from this Contact Header and use that along with the IP address of the phone to retrieve the entry from the secure phone database. The ASA phone proxy 1130 will update the phone's entry with the source port of the connection on which the Register arrived on. The connection on the ASA is illustrated below:
    Source IP Address/port: 98.208.23.107/7177
    Destination IP Address/port: 128.107.254.68/2443
    and the secure phone database will now have the port entry populated as illustrated below:

| Interface | IP Address | Port | MAC | Timeout | Idle |
|---|---|---|---|---|---|
| outside | 98.208.23.107 | 7177 | 000a.1234.0001 | 0:05:00 | 0:00:00 |
| outside | 98.208.23.107 | 7158 | 000a.1234.0002 | 0:05:00 | 0:00:15 |

Upon receiving subsequent Register refreshes from the phone, the phone's entry in the database will be retrieved and its timestamp will be updated. If the ASA phone-proxy 1130 no longer sees the SCCP StationRegister or SIP Register messages for the phone, the entry in the secure phone database for that phone will timeout and be removed from the database. The phone will not be able to register to the CUCM 1160 again until it starts over by trying to download the CTL file and its phone configuration file.

Routers do not have the ability to inspect and perform NAT on embedded IP addresses in encrypted SIP/SCCP payloads. SIP/SCCP messages therefore still contain the private IP addresses of the phones. For a CUCM 1160 to accept registration and/or calls from a phone, the SIP/SCCP messages should not contain the private address of the phone. Since the ASA Phone proxy 1130 intercepts the TLS signaling, and performs inspections on this traffic. The ASA Phone proxy 1130 can change the private address of the phone embedded in the SIP/SCCP payload to the address of the NAT router. Additionally, the ASA phone proxy 1130 may be configured to selectively forward encrypted packets as encrypted packets for authenticated or encrypted phones and to forward clear text for phones configured as non-secure phones.

Figure 12:
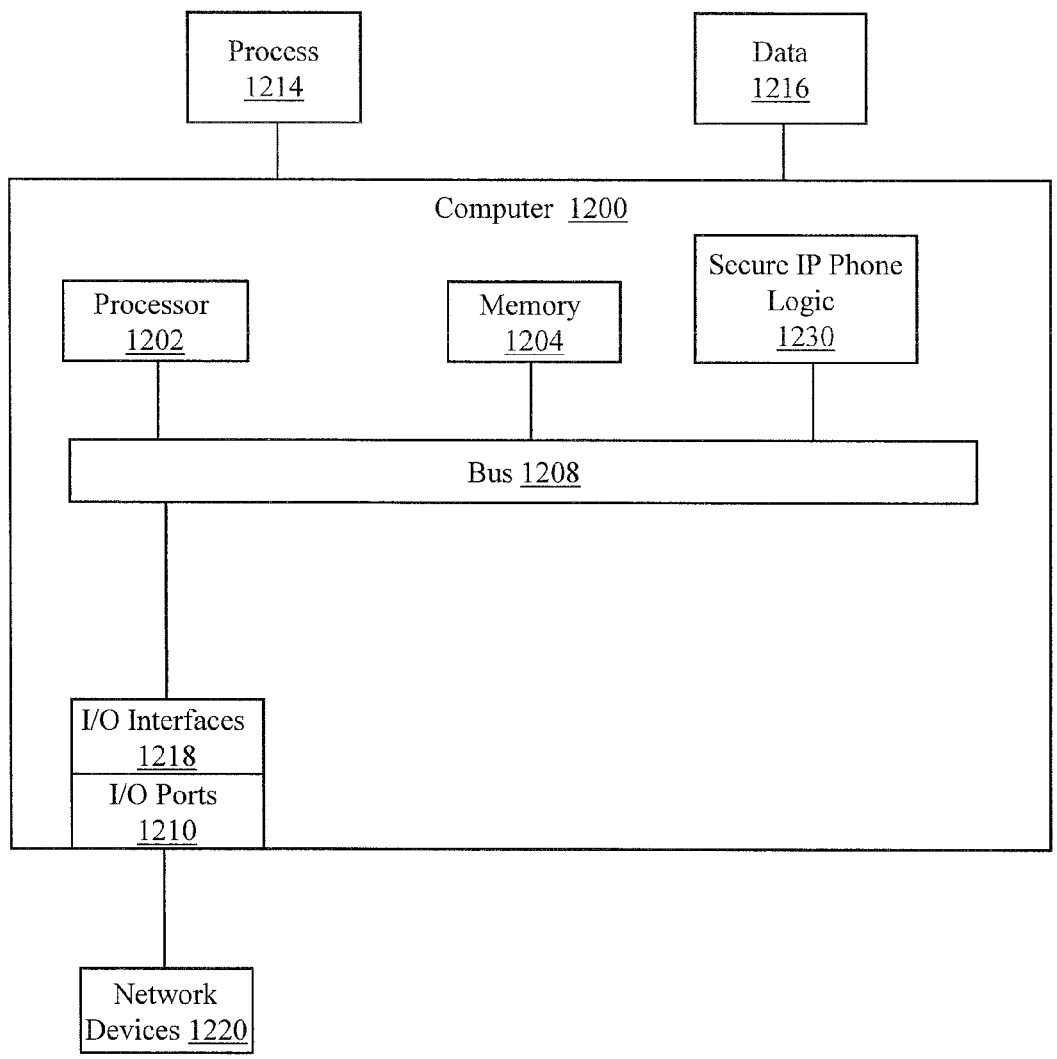
FIG. 12 illustrates an example computing environment in which example apparatus and methods, and equivalents, may operate.

FIG. 12 illustrates an example computing device in which example systems and methods described herein, and equivalents, may operate. The example computing device may be a computer 1200 that includes a processor 1202, a memory 1204, and input/output ports 1210 operably connected by a bus 1208. In one example, the computer 1200 may include a secure IP phone logic 1230 configured to facilitate securing and authenticating multiple devices behind a NAT. In different examples, the logic 1230 may be implemented in hardware, software, firmware, and/or combinations thereof. While the logic 1230 is illustrated as a hardware component attached to the bus 1208, it is to be appreciated that in one example, the logic 1230 could be implemented in the processor 1202. In one example, the secure IP phone logic 1230 may implement an ASA phone proxy.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Hardware component", as used herein, refers to a computer-related entity. Hardware components may include, for example, a processor, and an ASIC. A hardware component may be localized on one computer and/or may be distributed between multiple computers.

Logic 1230 may provide means (e.g., hardware, software, firmware) for authenticating a plurality of IP phones located behind a NAT device as a function of a secure IP phone data repository associated with a phone proxy server. The means may be implemented, for example, as an ASIC programmed to perform the authentication. The means may also be implemented as computer executable instructions that are presented to computer 1200 as data 1216 that are temporarily stored in memory 1204 and then executed by processor 1202.

Logic 1230 may also provide means (e.g., hardware, software, firmware) for selectively rewriting, in the phone proxy server, packet traffic between members of the plurality of IP phones and a call manager. The rewriting may be a function of data stored in the secure IP phone data repository Generally describing an example configuration of the computer 1200, the processor 1202 may be a variety of various processors including dual microprocessor and other multiprocessor architectures. A memory 1204 may include volatile memory and/or non-volatile memory. Non-volatile memory may include, for example, ROM, and programmable ROM (PROM). Volatile memory may include, for example, RAM, static RAM (SRAM), and dynamic RAM (DRAM). The memory 1204 can store a process 1214 and/or a data 1216, for example.

The bus 1208 may be a single internal bus interconnect architecture and/or other bus or mesh architectures. While a single bus is illustrated, it is to be appreciated that the computer 1200 may communicate with various devices, logics, and peripherals using other busses (e.g., peripheral component interconnect express (PCIE), 13124, universal serial bus (USB), Ethernet). The bus 1208 can be types including, for example, a memory bus, a memory controller, a peripheral bus, an external bus, a crossbar switch, and/or a local bus.

The computer 1200 may interact with input/output devices via the i/o interfaces 1218 and the input/output ports 1210. Input/output devices may be, for example, a keyboard, a microphone, a pointing and selection device, cameras, video cards, displays, and the network devices 1220. The input/output ports 1210 may include, for example, serial ports, parallel ports, and USB ports.

The computer 1200 can operate in a network environment and thus may be connected to the network devices 1220 via the i/o interfaces 1218, and/or the i/o ports 1210. Through the network devices 1220, the computer 1200 may interact with a network. Through the network, the computer 1200 may be logically connected to remote computers. Networks with which the computer 1200 may interact include, but are not limited to, a LAN, a WAN, and other networks.

While example systems, and methods and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, and methods described herein. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
controlling a phone proxy to provide security credential information to an Internet Protocol (IP) phone located behind a network address translation (NAT) device in response to receiving a certificate request from the IP phone, where the certificate request includes IP phone identifying addresses, the IP phone being one of a set of IP phones located behind the NAT device;
controlling the phone proxy to update an entry in a secure IP phone data store to relate together the IP phone identifying addresses, a source port associated with the IP phone, and a binary value indicating and the fact that the credential information was provided to the IP phone, which marks the IP phone as an authorized phone, the entry being addressable as a function of a least a portion of the IP phone identifying addresses;

and controlling a security proxy to selectively authenticate the IP phone in response to receiving a connection request from the IP phone, where the connection request includes the IP phone identifying addresses, and where the authentication is based, at least in part, on data stored in the secure IP phone data store that is addressable by the IP phone identifying addresses.

2. The method of claim 1, comprising:

controlling the phone proxy to selectively provide the connection request to a call manager upon determining that the IP phone was successfully authenticated by the security proxy.

3. The method of claim 2, comprising:

selectively rewriting a portion of an inbound packet received from the IP phone to make the inbound packet comply with a protocol associated with the call manager and providing the rewritten inbound packet to the call manager; and selectively rewriting a portion of an outbound packet received from the call manager to make the outbound packet comply with a protocol associated with the IP phone, and providing the rewritten outbound packet to the IP phone.

4. The method of claim 3, comprising:

managing a timeout property associated with a connection between the IP phone and the call manager as a function of monitoring protocol messages associated with the connection and data stored in the secure IP phone data store.

5. The method of claim 1, where the security credential information comprises a certificate trust list (CTL), and a configuration file.

6. The method of claim 3, where the IP phone identifying addresses comprise a media access control (MAC) address associated with the IP phone, a private IP address associated with the IP phone, and a public IP address associated with the NAT device.

7. The method of claim 6, where the secure IP phone data store is a database and where the entry in the secure IP phone data store is a record that relates the MAC address, the private IP address, the public IP address, a source port associated with the IP phone, and the fact that the security credential information was provided to the IP phone.

8. The method of claim 1, where the connection request is a call manager registration request, and where the call manager registration request is one of, a Session Initiation Protocol (SIP) registration request, and a Skinny Call Control Protocol (SCCP) station register message, where the SIP registration request includes the MAC address of the IP phone, and where the SCCP station register message includes the MAC address of the IP phone.

9. The method of claim 1, where the security proxy is a transport layer security (TLS) proxy.

10. The method of claim 6, where the inbound packet includes a private IP address of the IP phone, and where rewriting the inbound packet to comply with a protocol associated with the call manager comprises replacing the private IP address with a public IP address associated with the NAT device and where the outbound packet includes the public IP address associated with the NAT device, and where rewriting the outbound packet to comply with a protocol associated with the IP phone comprises replacing the public IP address with the private IP address.

11. The method of claim 4, where managing a timeout property associated with a connection between the IP phone and the call manager comprises:

receiving a connection protocol message associated with a connection between a connected IP phone and a connected call manager;

extracting, from the connection protocol message, connected IP phone identifying information;

identifying the connected IP phone and the connection between the identified connected IP phone and the connected call manager as a function of the IP phone identifying information and information stored in the secure IP phone data store; and selectively manipulating a timeout value associated with the connection.

12. The method of claim 11, where the connection protocol message is one of, an SIP register refresh message, and an SCCP keep alive message, and where the connected IP phone identifying information comprises a MAC address associated with the IP phone.

13. An apparatus, comprising:

a certificate logic configured to provision a member of a set of Internet Protocol (IP) phones located behind a network address translation (NAT) device in response to receiving a certificate request from the IP phone, where the certificate request includes IP phone uniquely identifying material;

a provisioned IP phone data store configured to store uniquely identifying material concerning IP phones that have successfully been provisioned by the apparatus;

an information control logic configured to update the provisioned IP phone data store to store information that an IP phone was provisioned by relating the IP phone uniquely identifying material and a credentialed value;

and controlling a security proxy to selectively authenticate the IP phone in response to receiving a connection request from the IP phone, where the connection request includes the IP phone identifying addresses, and where the authentication is based, at least in part, on data stored in the secure IP phone data store that is addressable by the IP phone identifying addresses.

14. The apparatus of claim 13, where the certificate logic ASIC is configured to provision the IP phone with a certificate trust list (CTL) and a configuration file, where the IP phone uniquely identifying material comprises a media access control (MAC) address associated with the IP phone, a private IP address associated with the IP phone, a public IP address associated with the NAT device, and a source port associated with the IP phone, and where the provisioned IP phone data store is a database table comprising records that relate the IP phone uniquely identifying material, connection timeout information, and IP phone provisioning state information.

15. The apparatus of claim 14, comprising:

a transport layer security (TLS) proxy logic configured to selectively authenticate an IP phone in response to receiving a call manager connection registration request from the IP phone, where the authentication is a function of MAC addressable data stored in the provisioned IP phone data store; and a forward logic configured to selectively provide an IP phone connection registration request to the call manager upon determining that the IP phone was successfully authenticated by the TLS proxy logic.

16. The apparatus of claim 15, where the forward logic is configured to selectively replace a private IP address located in an inbound packet received from an IP phone to a public IP address associated with a NAT device associated with the IP phone, and to provide the rewritten inbound packet to the call manager.

17. The apparatus of claim 16, where the forward logic is configured to selectively replace a public IP address in an outbound packet received from the call manager with a private IP address associated with an IP phone, and to provide the rewritten outbound packet to the IP phone.

18. The apparatus of claim 17, comprising:
   a timeout logic configured to manage connection timeouts between the IP phone and the call manager as a function of protocol messages associated with the connection and data stored in the provisioned IP phone data store.

19. A non-transitory computer-readable medium storing computer executable instructions that when executed by a computer control the computer to perform a method, the method comprising:
   controlling a phone proxy to provide security credential information to an Internet Protocol (IP) phone located behind a network address translation (NAT) device in response to receiving a certificate request from the IP phone, where the certificate request includes IP phone identifying addresses, the IP phone being one of a set of IP phones located behind the NAT device;
   controlling the phone proxy to update an entry in a secure IP phone data store to relate together the IP phone identifying addresses, a source port associated with the IP phone, and a binary value indicating the fact that the credential information was provided to the IP phone, which marks the IP phone as an authorized phone, the entry being addressable as a function of a least a portion of the IP phone identifying addresses;
   and controlling a security proxy to selectively authenticate the IP phone in response to receiving a connection request from the IP phone, where the connection request includes the IP phone identifying addresses, and where the authentication is based, at least in part, on data stored in the secure IP phone data store that is addressable by the IP phone identifying addresses.

\* \* \* \* \*

UNITED STATES PATENT AND TRADEMARK OFFICE
CERTIFICATE OF CORRECTION

PATENT NO.        : 8,752,161 B1
APPLICATION NO.   : 12/507315
DATED             : June 10, 2014
INVENTOR(S)       : Hien Thi Thai, Anupama Anand and Jianxin Wang It is certified that error appears in the above-identified patent and that said Letters Patent is hereby corrected as shown below:

In the Claims:

Claim 1, Column 14, line 66, delete the second occurrence of "and" in the phrase 'indicating and the fact'
Claim 13, Column 16, line 21, after 'An apparatus, comprising:', add --a processor;--
Claim 13, Column 16, line 22, after 'a certificate logic', add --ASIC coupled to the processor and--
Claim 13, Column 16, line 28, after 'a provisioned IP phone data store', add --coupled to the processor and--
Claim 13, Column 16, line 31, after 'an information control logic', add --ASIC coupled to the processor and--

Signed and Sealed this
Seventh Day of October, 2014

Michelle K. Lee
*Deputy Director of the United States Patent and Trademark Office*